Patented June 29, 1937

2,085,501

UNITED STATES PATENT OFFICE 2,085,501

MANUFACTURE OF ALKYL ACID SALTS

Joseph Hidy James, Pittsburgh, Pa., assignor to Clarence P. Byrnes, Pittsburgh, Pa., trustee No Drawing. Application April 12, 1935, Serial No. 16,013

7 Claims. (Cl. 260—99.12)

My invention relates to the preparation of alkyl acid esters by treating a hydrocarbon having artificially-introduced chemically-combined oxygen, such as the mixture obtained by partial oxidation of petroleum fractions with air or a gas containing oxygen; with sulphuric acid or equivalent inorganic acids such as those having three or more replaceable hydrogen atoms, as well as the corresponding "pyro" acids and also acids other than sulphuric acid having lower oxygen content than those first named, such as the "ous" acids, including phosphorous acid, arsenious acid, etc. I intend to include all such equivalent acids such as boric acid, phosphoric acid, arsenic acid, etc.

In my previous Patent No. 1,753,516 of April 8, 1930, I have described sulphonating my partial oxidation products of hydrocarbon such as petroleum fractions; and in my copending applications Ser. No. 688,862, filed September 9, 1933 and Ser. No. 759,239, filed December 26, 1934, I have disclosed such treatments.

In further investigation and research along these lines, I have discovered that it is of special advantage in such processes to increase the percentage of unsaturateds in the partial oxidation mixture. This oxidation mixture when produced by my vapor phase partial oxidation process contains, each in varying weights, such bodies as alcohols, alkyl aldehydes, aldehydes, lactones, ketones, esters, ethers and oxygenated organic acids, including some unsaturated compounds as there has always been some cracking incidental to my process on account of the temperature used which normally runs above 250° C. and under 500° C. In order to increase the unsaturated content of such a condensed partial oxidation product, I have devised two different species of process under the genus of increasing the percentage of unsaturateds therein. One of such methods consists primarily in carrying out my vapor phase partial oxidation process in the normal manner and then passing the exit gas with its content of the vaporized mixture recited above and produced by partial oxidation, through a cracking apparatus after the partial oxidation process has been carried out. This cracking preferably contains or consists of a catalyst to assist in the cracking operation, this, for instance, being nickel, as by passing the exit mixture through a heated nickel tube maintained at a cracking temperature, for example, 550° C.

The other species consists essentially in carrying out my vapor phase partial oxidation process itself at a higher temperature than theretofore, especially a temperature within the red heat range, such for example as 520° C., and preventing ignition of and wasting of the charge by actual complete combustion, preferably by adding water or steam. Also, in such case, I preferably employ a catalyst of the type which is not volatile at the temperature used, such for example as vanadium pentoxide.

I will now describe these two different species more in detail and give examples in each case.

In my vapor phase catalytic oxidation, the product mixture contains as above shown, alcohols, aldehydes, ketones and oxygenated acids. While carboxylic acids are objectionable if present in large amounts because of the calcium insolubility thereof, my present procedure tends to eliminate the carboxylic groups, still leaving sulphatable molecules. Under these species, in preparing the material for sulphating-sulphonating, I preferably increase the content of unsaturateds by "cracking" the partial oxidation product mixture, preferably while in the vapor phase. This general process of cracking such a product mixture is disclosed in my Patent No. 1,587,796 of August 31, 1926, which, however, contains no disclosure as to the advantages and peculiar adaptability of such a cracked product for producing alkyl acid salts.

I have now found that such a cracking process applied to a partial oxidation product reduces the gas losses and formation of side products, and hence, is advantageous over the oxidation of previously cracked material and also is of advantage in that, for the manufacture of detergents, I can separate out and remove the lighter portion of the product, thus using only the heavier portion, preferably above $C_6$ or $C_8$, and essentially from $C_{12}$ to $C_{24}$ for sulphating-sulphonating, thus obtaining alkyl acid salts which are particularly and peculiarly adapted for detergent use.

By cracking the partial oxidation product, I control to a better extent the average molecular weight of the sulphatable product, since the opening up of the molecules for sulphation is accomplished by breaking of fragments or end portions of the oxidized portions, such as carbon monoxide and carbon dioxide, rather than by the scission or breaking of the molecules into two nearly equal parts, which occurs in the case of the plain cracking of straight hydrocarbons. This clipping or cutting off of a few carbon atoms in the case of thermal decomposition of the partial oxidation product results in making the mixture easier and better to sulphate, while the majority of the mixture will thus come within the range of the best detergents, namely $C_{12}$ to $C_{24}$, inclusive. Where straight hydrocarbon cracking is used, the middle scission of so many molecules present gives much sulphated-sulphonated matter which is below the desired range of carbon content. Also, after partially oxidizing and cracking, the lighter material may be separated out by fractional distillation or otherwise, to give the desired or best carbon range in the material which is subjected to sulphating-sulphonating or its equivalent.

*Example 1.*—The material subjected to thermal decomposition was the partially oxidized product obtained by my vapor phase catalytic method using a molybdenum oxide catalyst and a proper temperature of air containing free oxygen applied to a "Coastal" lubricating oil (300 vis.). The cracking apparatus consisted of a nickel tube 30 inches long and 1¾ inch inside diameter, and the catalytic material consisting of 20% nickel and 80% asbestos.

The quantity of this catalytic material was such that the vapor exit mixture from the oxidation apparatus which entered it at the rate of 200 cc. per hour was in contact with the catalyst for about two seconds. A temperature of about 550° C. was maintained in the nickel tube by external heating. Considerable quantities of gas were formed and from 750 cc. of oxidation mixture fed, 565 cc. of liquid cracked product was obtained giving a volume percentage yield of 62%. The specific gravity of the original oxidation mixture was .939, while that of the cracked product was slightly higher, about .957.

When the cracked product thus obtained was sulphated-sulphonated by the addition of sulphuric acid, as set forth for example in my Patent No. 1,753,516, it gave a 65% contraction for the cracked product as against 48% contraction for the original oxidation mixture. Sulphate-sulphonate soaps made from the cracked product showed better detergent properties in hard water than similar products made from the original oxidation mixture.

Of course, other catalysts may be used than above named, such for example, as magnesium oxide; or no catalyst at all may be used in the cracking step.

In the other species herein set forth when preparing for the making of alkyl acid salts, I increase the percentage of unsaturateds by carrying out my vapor phase oxidation process at a higher temperature than otherwise employed, namely, at a temperature within a red heat. Such a temperature increases the gas losses, but excessive loss is prevented by feeding water or steam or a diluent, which prevents the ignition and complete continuous combustion.

Referring again to sulphating-sulphonating in the broad sense herein used, it is desirable for this purpose to obtain my product with a light percentage of unsaturated hydrocarbons and a minimum of molecules carrying carboxylic groups, since the latter, on saponification to form sodium soaps, will form insoluble soaps of calcium, magnesium, iron or aluminum, if used in waters containing such soluble salts. The unsaturated hydrocarbons and alcohols react with sulphuric acid to make alkyl acid esters of sulphuric acid, the soaps of which have the desired properties in hard water. Other oxidized bodies than the carboxylic acids, as for example, the ketones and aldehydes, form sulphonates during the sulphuric acid treatment. The higher temperatures employed under this species tend to break down the ketones with elimination of carbon monoxide and the formation of unsaturated hydrocarbons. Alcohols may form unsaturated hydrocarbons by elimination of the water elements. Oxygenated carboxylic acids thermally break down with formation of unsaturated hydrocarbons and the elimination of carbon dioxide.

Under this species, I accurately regulate the feeding of the desired proportions of air, hydrocarbon and steam to the vapor phase oxidation process where a catalyst is preferably used, and supply heat from an external source to keep the temperature within the range desired for the reactions discussed, the radiation and other heat losses holding the temperature at the point desired, although special artificial cooling may be used if desired, this being set forth, for example, in my application Ser. No. 435,355, filed January 6, 1921. The steam supplied serves to protect the products of oxidation from change, as well as the desired products of thermal decomposition. As before stated, the catalyst is preferably non-volatile at the temperature named.

*Example 2.*—The catalytic apparatus was generally of the one-screen type described in previous of my patents, the screen catalyst being of vanadium pentoxide mounted on asbestos, (85% oxide and 15% asbestos). The free volume of the reacting chamber was such that the gases and vapors of the feed were in contact with the catalyst for about two seconds. Heat was continuously applied in regulated amount to maintain the temperature. The material oxidized consisted of commercial Pennsylvania wax distillate with a specific gravity of .852 at 60° F. A run of five hours was made with the temperature of the catalytic zone about 535° C. Air feed, 18 liters per minute; oil feed, 1.17 liters per hour and water feed, about 260 cc. per hour.

At the high temperature used, thermal decomposition of the oxidized products resulted in a considerable amount of gaseous substances not recovered. The actual oil oxidation mixture condensed and recovered amounted to 56% by volume of the oil fed. The specific gravity of the oil oxidation product was .873 at 60° F. Its general composition was indicated from the following tests: concentrated sulphuric acid gave a 57% volume contraction; sodium hydroxide saponification gave a 14% volume contraction, and the sodium bisulphite test gave a 10% volume contraction. It differed from my ordinary partial oxidation product in containing a higher percentage of unsaturateds.

A portion of the oxidized oil was vacuum-distilled to a residue of 10% by volume, and the condensate sulphated-sulphonated in the usual way, as set forth in my Patent No. 1,753,516, and sulphate-sulphonate soaps then prepared. This resulted in the recovery of 14.2% of sodium soaps from the oil sulphated, an increase of 50% over a lower temperature (48° C.) oxidation. These soaps thus produced showed good stability in hard water.

This second species or method shows another way of increasing the sulphated material from hydrocarbon mixtures.

By operating my vapor phase partial oxidation process at these higher temperatures, I increase the cracking reaction and, in effect, obtain partial oxidation and thermal decomposition in one physical step, although I believe that the thermal decomposition usually follows the oxidation step.

The advantages of my invention result from the process which forms detergents of better quality, larger yield, etc., by increasing the percentage of unsaturateds in the partial oxidation product employed. In sulphating-sulphonating the reaction of the acid with the alcohols differs from that of the reaction of the acid with the unsaturateds, but the results are the same, namely, the production of alkyl acid salts, in this case, sulphates. Hence, in obtaining detergents, I procure a larger percentage by increasing the unsaturateds. Still more important, I obtain a larger percentage of detergents within the desirable range, since as above shown, the cracking of the oxidized material gives a larger percentage of longer chains having a larger number of carbon atoms. Hence, there is a peculiar and specific coaction between increasing the unsaturateds in a partial oxidation product and the step of sulphating-sulphonating to obtain detergents, both as regards quantity and quality of the product thus obtained.

While I do not wish to be limited to my theory that, when the higher temperature is used in my partial oxidation process, the increased cracking is that of already oxidized material, nevertheless, for the purposes of my broader claims, I shall use the terms "cracking" and "partial oxidation product" in this sense to cover both species herein described.

I consider myself the first to discover the special advantages of increasing the unsaturateds in such a product and then forming alkyl acid sulphates therefrom.

I claim:

1. In the manufacture of alkyl acid salts, the steps consisting of partially oxidizing liquid hydrocarbon, cracking the partially oxidized material, and then treating the same with a polybasic mineral acid to obtain alkyl acid salts.

2. In the manufacture of alkyl acid salts, the steps consisting of increasing the percentage of unsaturates in the product mixture from partial oxidation of liquid hydrocarbons by free oxygen by cracking the same and then sulphating-sulphonating the product.

3. In the manufacture of alkyl acid salts, the steps consisting of increasing the percentage of unsaturates in the product mixture from partial oxidation of liquid hydrocarbons by free oxygen by cracking the same, fractioning the product, and treating a heavier fraction with a polybasic mineral acid to produce alkyl acid salts.

4. In the manufacture of alkyl acid salts, the steps consisting of increasing the percentage of unsaturates in the product mixture from partial oxidation of liquid hydrocarbons by free oxygen by cracking the same, fractioning the product, and sulphating-sulphonating a heavier fraction.

5. As a new article of manufacture, a mixture of alkyl acid salts obtained by treating the cracked partial oxidation product from partial oxidation of a liquid hydrocarbon with free oxygen with a polybasic mineral acid to obtain alkyl acid salts.

6. As a new article of manufacture, a mixture of alkyl acid salts obtained by treating a heavier fraction of a cracked partial oxidation product from partial oxidation of a liquid hydrocarbon with free oxygen with a polybasic mineral acid to obtain alkyl acid salts.

7. In the manufacture of alkyl acid salts, the steps consisting of increasing the percentage of unsaturateds in a partial oxidation mixture by cracking the same, fractioning the product into fractions of different boiling ranges, but containing like bodies and treating one of said fractions with a polybasic mineral acid.

JOSEPH HIDY JAMES.